(12) United States Patent
Liao

(10) Patent No.: US 11,663,526 B2
(45) Date of Patent: May 30, 2023

(54) DOCUMENT PROCESSING SYSTEM AND METHOD FOR PERFORMING DOCUMENT CLASSIFICATION BY MACHINE LEARNING

(71) Applicant: AVISION INC., Hsinchu (TW)

(72) Inventor: Chun-Chieh Liao, Hsinchu (TW)

(73) Assignee: AVISION INC., Hsinchu (TW)

( * ) Notice: Subject to any disclaimer, the term of this patent is extended or adjusted under 35 U.S.C. 154(b) by 285 days.

(21) Appl. No.: 17/160,326

(22) Filed: Jan. 27, 2021

(65) Prior Publication Data
US 2021/0240974 A1 Aug. 5, 2021

(30) Foreign Application Priority Data
Jan. 30, 2020 (TW) .................................. 109102766

(51) Int. Cl.
| | | |
|---|---|---|
| *G06N 20/00* | (2019.01) | |
| *G06V 30/413* | (2022.01) | |
| *G06F 18/214* | (2023.01) | |
| *G06V 30/19* | (2022.01) | |
| *G06V 30/10* | (2022.01) | |

(52) U.S. Cl.
CPC ........... *G06N 20/00* (2019.01); *G06F 18/214* (2023.01); *G06V 30/19147* (2022.01); *G06V 30/413* (2022.01); *G06V 30/10* (2022.01)

(58) Field of Classification Search
CPC combination set(s) only.
See application file for complete search history.

(56) References Cited

U.S. PATENT DOCUMENTS

| | | | | |
|---|---|---|---|---|
| 11,321,558 | B2* | 5/2022 | Okada | G06V 30/416 |
| 11,423,308 | B1* | 8/2022 | Somanath | G06V 10/751 |
| 11,521,404 | B2* | 12/2022 | Shimizu | G06K 9/6201 |
| 11,537,506 | B1* | 12/2022 | Dasgupta | G06F 11/1476 |
| 2015/0254532 | A1* | 9/2015 | Talathi | G06N 3/0454 |
| | | | | 382/156 |
| 2018/0063552 | A1* | 3/2018 | Kim | H04N 19/48 |
| 2021/0081093 | A1* | 3/2021 | Yun | H04N 5/232935 |
| 2021/0306511 | A1* | 9/2021 | Inoue | H04N 1/32128 |
| 2022/0075845 | A1* | 3/2022 | Bowen | G06F 21/10 |

FOREIGN PATENT DOCUMENTS

| | | |
|---|---|---|
| TW | I662511 B | 6/2019 |
| TW | 202004519 A | 1/2020 |

\* cited by examiner

*Primary Examiner* — Helen Zong

(57) ABSTRACT

A document processing system and method for performing document classification by machine learning include an input module, a processing module, and at least one storage module preconfigured with a classification folder matching a code. Upon completion of a first-instance model construction procedure, the input module receives a document image. The processing module compares the document image with a machine learning model information to generate a computation result and stores the document image in the classification folder according to the computation result. Therefore, classification of the document images is automated according to the code of the corresponding classification folder, thereby enhancing the accuracy and efficiency of document classification.

11 Claims, 8 Drawing Sheets

DOCUMENT PROCESSING SYSTEM AND METHOD FOR PERFORMING DOCUMENT CLASSIFICATION BY MACHINE LEARNING

CROSS-REFERENCE TO RELATED APPLICATION

This non-provisional application claims priority under 35 U.S.C. § 119(a) on Patent Application No(s).109102766 filed in Taiwan, R.O.C. on Jan. 30, 2020, the entire contents of which are hereby incorporated by reference.

BACKGROUND OF THE INVENTION

1. Field of the Invention

The present disclosure relates to document processing systems and methods, and in particular to a document processing system and method for performing document classification by machine learning.

2. Description of the Related Art

Thanks to ever-changing technologies, electronic apparatuses which assist with paperwork keep emerging. Related examples are photocopiers, scanners, and multifunction printers. A paper document is placed on a paper feeding component or a paper receiving component of a photocopier, scanner or multifunction printer and then scanned by a scanning component thereof to generate electronic document images for storage, so as to render document storage convenient. Therefore, photocopiers, scanners and multifunction printers are found in government offices, hospitals, clinics, convenience stores, shopping malls, banks, and the like to help with document processing.

Government offices, banks, hospitals, clinics and the like require customers to fill out paper-based application forms in different formats for different reasons. The completed paper-based application forms are scanned with photocopiers, scanners or multifunction printers to generate electronic document images. Then, either barcodes (or patch codes) on the completed paper-based application forms are manually scanned with barcode scanners, or the completed paper-based application forms have their formats or specific printed characters identified manually, in order for the electronic document images to be classified and filed. However, the odds are that the barcode scanners will fail and barcodes will be smeared and thus cannot be read. Furthermore, the accuracy in the manual classification and filing of electronic document images must not be taken for granted.

As a result, the prior art is undesirably time-consuming, inefficient and susceptible to mistakes, thereby predisposing governments and banks to legal disputes as well as hospitals and clinics to medical disputes.

BRIEF SUMMARY OF THE INVENTION

An objective of the present disclosure is to provide a document processing system and method for performing document classification by machine learning, for example, presetting a code matching a classification folder, and performing computation on document images by machine learning, so as to classify and store the document images according to the code of the classification folder. Therefore, document classification is automated, thereby enhancing the accuracy and efficiency of document classification.

To achieve at least the above objective, the present disclosure provides a document processing method for performing document classification by machine learning, the method being applicable to a document processing system preconfigured with at least one classification folder, the classification folder matching a code, the method comprising the steps of:

receiving at least one document image;

performing computation on the document image and a machine learning model information generated after undergoing a first-instance model construction procedure, so as to generate a computation result; and storing the document image in a corresponding classification folder according to the computation result and the code of the classification folder.

The method has advantageous technical features as follows: receiving at least one document image; performing computation on the document image and a machine learning model information generated after undergoing a first-instance model construction procedure, so as to generate a computation result; and storing the document image in a corresponding classification folder according to the computation result and the code of the classification folder. Therefore, the method simplifies and automates the classification procedure, thereby enhancing the accuracy and efficiency of document classification.

To achieve at least the above objective, the present disclosure further provides a document processing system for performing document classification by machine learning, comprising:

an input module for obtaining at least one document image;

at least one storage module preconfigured with a classification folder matching a code; and a processing module connected to the input module and the storage module, wherein the processing module receives the document image, performs computation on the document image and a machine learning model information generated after undergoing a first-instance model construction procedure so as to generate a computation result, and compares the code of the classification folder with the computation result so as to store the document image in the corresponding classification folder.

The system has advantageous technical features as follows: an input module for obtaining at least one document image; at least one storage module preconfigured with a classification folder matching a code; and a processing module connected to the input module and the at least one storage module. The processing module receives the document image, performs computation on the document image and a machine learning model information generated after undergoing a first-instance model construction procedure so as to generate a computation result, and compares the code of the classification folder with the computation result so as to store the document image in the corresponding classification folder. Therefore, the system simplifies and automates the classification procedure, thereby enhancing the accuracy and efficiency of document classification.

DETAILED DESCRIPTION OF THE INVENTION

To facilitate understanding of the object, characteristics and effects of this present disclosure, embodiments together with the attached drawings for the detailed description of the present disclosure are provided.

Figure 1:
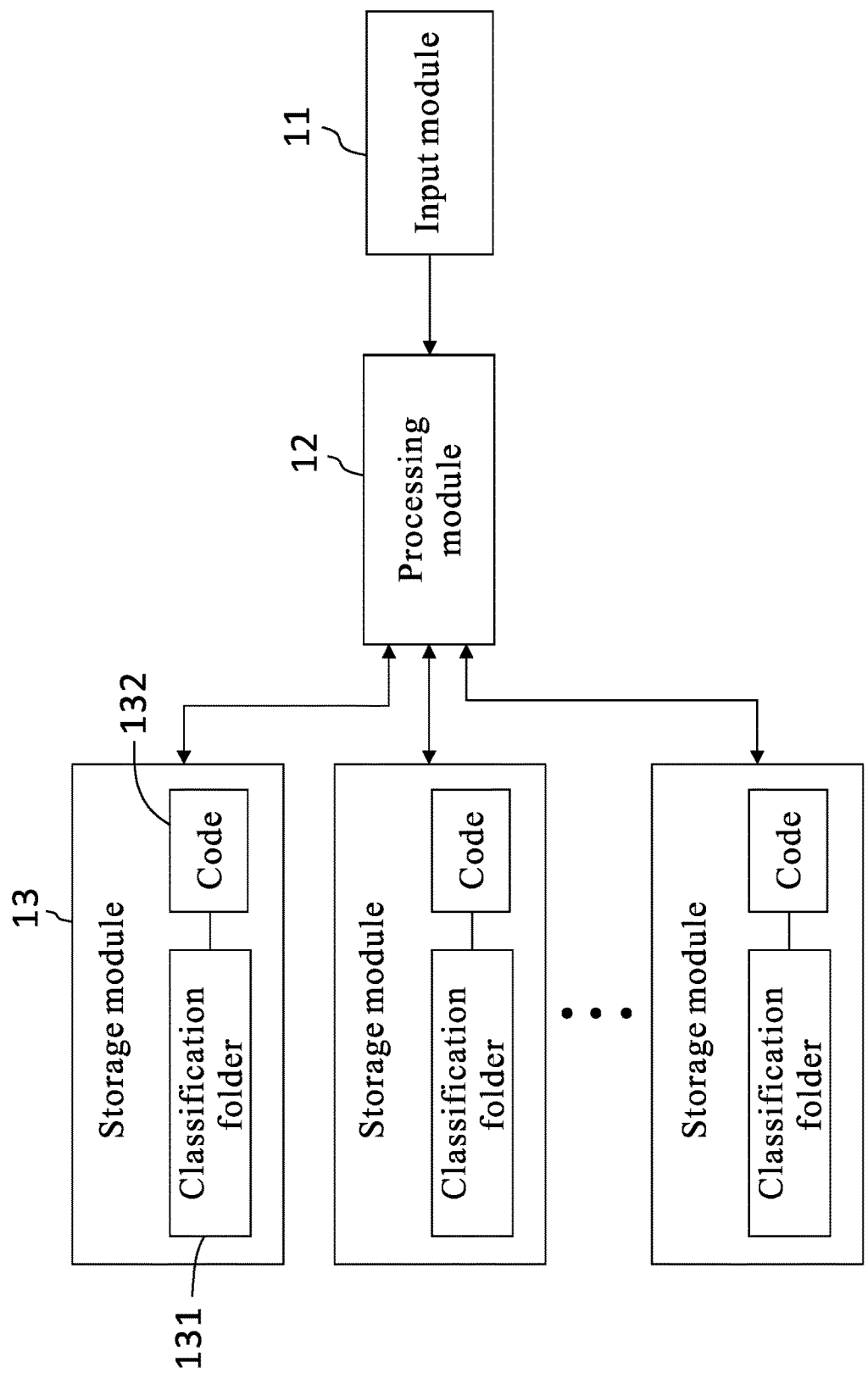
FIG. 1 is a block diagram of a preferred embodiment of the present disclosure.

Referring to FIG. 1, a document processing system for performing document classification by machine learning according to a preferred embodiment of the present disclosure comprises an input module 11, a processing module 12 and at least one storage module 13. The processing module 12 is electrically connected to the input module 11 and the storage module 13. In this embodiment, the system is for use with a photocopier, a scanner or a multifunction product/printer/peripheral (MFP), which is capable of scanning documents. In this embodiment, the system further comprises two or more storage modules 13 for storing different data, respectively.

In this embodiment, the input module 11 obtains at least one document image according to at least one paper document to be scanned by a user. After being processed by the processing module 12, the document image is stored in the storage module 13. The storage module 13 is preconfigured with a classification folder 131. The classification folder 131 matches a code 132. The processing module 12 compares the document image with the code 132 of the classification folder 131 to determine whether the document image is stored in the classification folder 131. The storage modules 13 each come with at least one classification folder 131. Each classification folder 131 matches the code 132. Consequently, the comparison of the document image and the code 132 of each classification folder 131 renders it feasible to determine which classification folder 131 to store the document image. In this embodiment, by matching each classification folder 131 and the code 132, it is feasible to label the corresponding the code 132 automatically rather than manually or in advance whenever the storage modules 13 are preconfigured with the classification folders 131, respectively, thereby simplifying the determination classification. In addition, to meet the need for special recognition, the classification folders 131 are preconfigured with the codes 132, respectively, whenever the storage modules 13 are preconfigured with the classification folders 131, respectively. The foresaid advantageous technical features are not restrictive of the present disclosure.

In practice, after the user has put at least one paper document into a photocopier, scanner or multifunction printer capable of scanning documents, the input module 11 obtains and sends at least one document image to the processing module 12. The processing module 12 performs computation on the received document image and a machine learning model information generated after undergoing a first-instance model construction procedure, so as to generate a computation result. The processing module 12 compares the code 132 of the classification folder 131 with the computation result, so as to store the document image in the classification folder 131.

The computation result of the document image comprises a code. The processing module 12 compares the code 132 of the classification folder 131 with the code of the computation result so as to determine whether the codes are identical. Upon an affirmative determination, the processing module 12 stores the document image in the classification folder 131.

If the processing module 12 is unable to determine, according to the computation result, whether the document image to be classified must be stored in the classification folder 131, the processing module 12 will execute an auxiliary determination procedure to determine whether the document image to be classified must be stored in the classification folder 131. The auxiliary determination procedure entails obtaining at least one image feature information which matches the document image by the processing module 12 according to the received document image, processing the at least one image feature information according to the image feature information to generate an auxiliary determination result, and comparing the code 132 of the classification folder 131 with the auxiliary determination result so as to determine whether the document image is stored in the classification folder 131. The auxiliary determination result comprises a code. The processing module 12 compares the code 132 of the classification folder 131 with the code of the auxiliary determination result so as to determine whether to store the document image in the classification folder 131. Therefore, the auxiliary determination procedure enhances the accuracy and appropriateness of the classification of the document images. In this embodiment, the image feature information comprises an optical character recognition (OCR) information, a document image size information, and a document image color information.

As mentioned before, the machine learning model information, which the processing module 12 compares with the document image, is generated through the first-instance model construction procedure, whereas the first-instance model construction procedure is executed by the processing module 12 to set the code 132 which matches the classification folder 131. The code 132 is automatically preset or subsequently automatically set by the processing module 12 or set by the user. The input module 11 receives a plurality of document images for use in machine learning. The processing module 12 processes the document images with a machine learning procedure to generate the machine learning model information. The machine learning model information comprises coefficients, one of which matches the code 132 of the classification folder 131. After the processing module 12 has finished generating the machine learning model information, the first-instance model construction procedure ends. The first-instance model construction procedure is effective in generating the machine learning model information required for automation of the classification of document images and enhancing the accuracy and efficiency of the classification document image.

Figure 2:
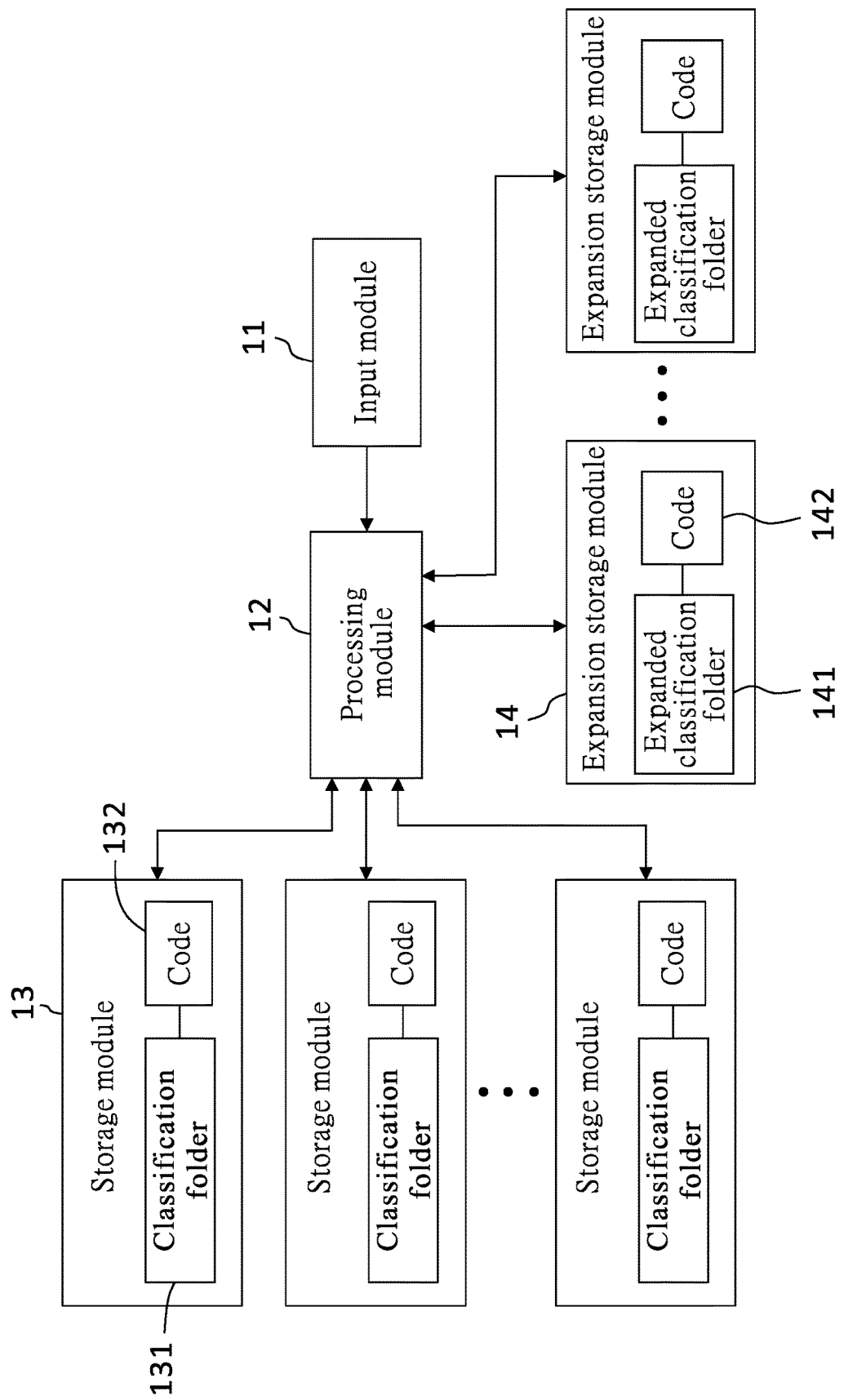
FIG. 2 is another block diagram of the preferred embodiment of the present disclosure.

Referring to FIG. 2, in another embodiment, when the user has different types of document images to classify, the document processing system of the present disclosure further comprises at least one expansion storage module 14 preconfigured with an expanded classification folder 141, and the processing module 12 further executes an expansion model construction procedure whereby the document images of different types undergo expanded classification.

The expansion model construction procedure is executed by the processing module 12 to set the corresponding expanded classification folder 141. The expanded classification folder 141 matches a code 142. The processing module 12 receives a plurality of document images for use in machine learning and processes the document images with the machine learning procedure to generate a new machine learning model information. The new machine learning model information comprises new coefficients. The new coefficients match the code 132 of the classification folder 131 and the code 142 of the expanded classification folder 141. After the processing module 12 has finished generating the new machine learning model information, the expansion model construction procedure ends. Computation is performed on the new machine learning model information, the document images of different types and the document images whose classification has already been determined, such that the document images of different types and the document images whose classification has already been determined can be classified and stored in the corresponding classification folder 131 or the corresponding expanded classification folder 141, so as to enhance the application expandability and the application flexibility of the document processing system.

A scenario in which the document processing system of the present disclosure is used is described below but is not intended to be restrictive of the present disclosure. For instance, if the user has two bills of different types to classify, the user will obtain document images of the two bills of different types with the input module 11. After that, the processing module 12 compares the two obtained document images with the machine learning model information consecutively to obtain the corresponding computation results consecutively. Next, the processing module 12 compares the two computation results with the code 132 of the classification folder 131 consecutively to determine which one of the two bills to have its document image classified and stored in the classification folder 131. If the processing module 12 performs the aforesaid comparison process but fails to identify the code 132 of the corresponding classification folder 131 for the document image of one of the two bills, the processing module 12 will determine the classification folder 131 to store in with the auxiliary determination procedure. Furthermore, if the user has bills of the other types to classify, a corresponding number of the expansion storage modules 14 must be provided, and each expansion storage module 14 is preconfigured with one corresponding expanded classification folder 141. The processing module 12 performs the expansion model construction procedure to obtain a new machine learning model information required to yield a computation result for determining which one of the classification folders 131 or expanded classification folders 141 to store in.

As disclosed above, the input module 11 sends received document images to the processing module 12. The processing module 12 performs computation on the received document images according to a machine learning model information to generate a computation result, then compares the code 132 of the classification folder 131 with the computation result to determine whether to classify and store the document image in the classification folder 131, and finally stores the document image in the corresponding classification folder 131, so as to simplify and automate the classification procedure and thereby enhance the accuracy and efficiency of document classification.

Moreover, the auxiliary determination procedure is effective in coping with any document images which the document processing system of the present disclosure is currently unable to judge, i.e., by effecting auxiliary determination, thereby enhancing the accuracy and appropriateness of document image classification.

In addition, the expansion model construction procedure is effective in achieving expanded classification of different types of document images, thereby enhancing the application expandability and the application flexibility of the present disclosure.

Figure 3:
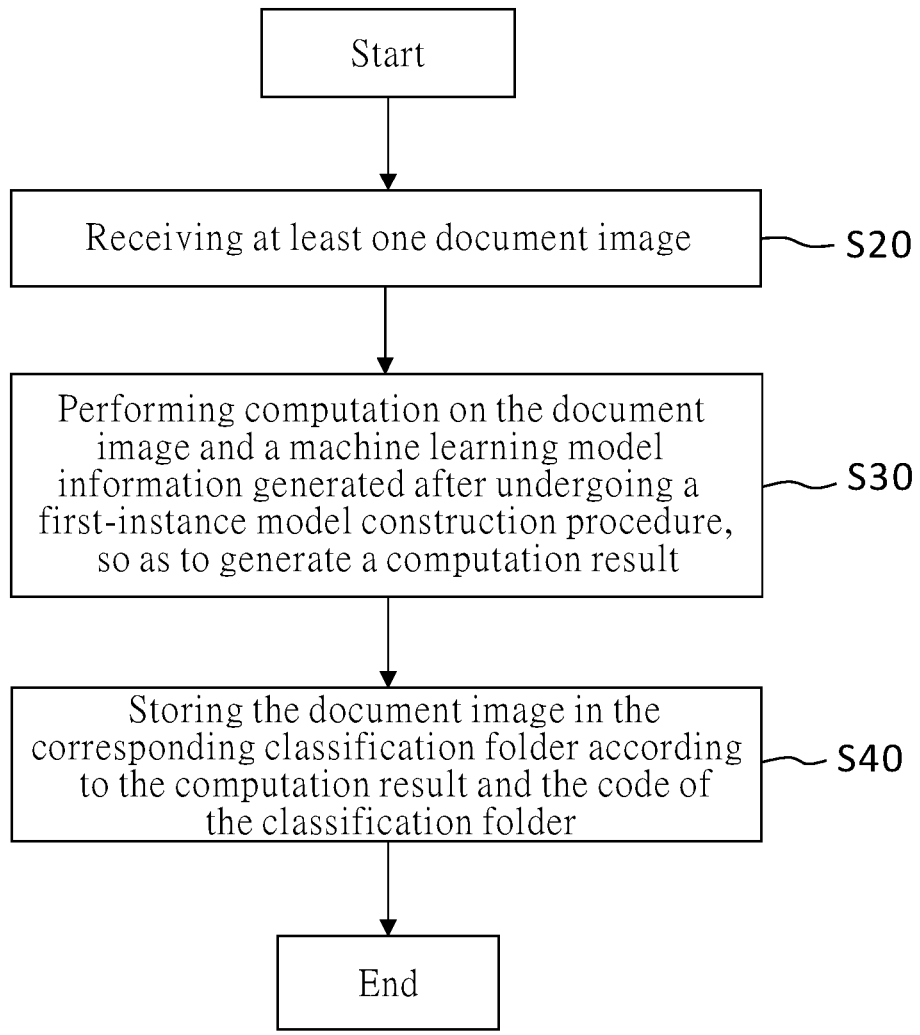
FIG. 3 is the first flowchart of a method according to a preferred embodiment of the present disclosure.

Referring to FIG. 3, the present disclosure further provides a document processing method for performing document classification by machine learning, the method being applicable to the document processing system disclosed above and preconfigured with at least one classification folder 131, the classification folder 131 matching the code 132, the method comprising the steps of:

receiving at least one document image (S20);

performing computation on the document image and a machine learning model information generated after undergoing a first-instance model construction procedure, so as to generate a computation result (S30); and storing the document image in the corresponding classification folder 131 according to the computation result and the code 132 of the classification folder 131 (S40).

Figure 4:
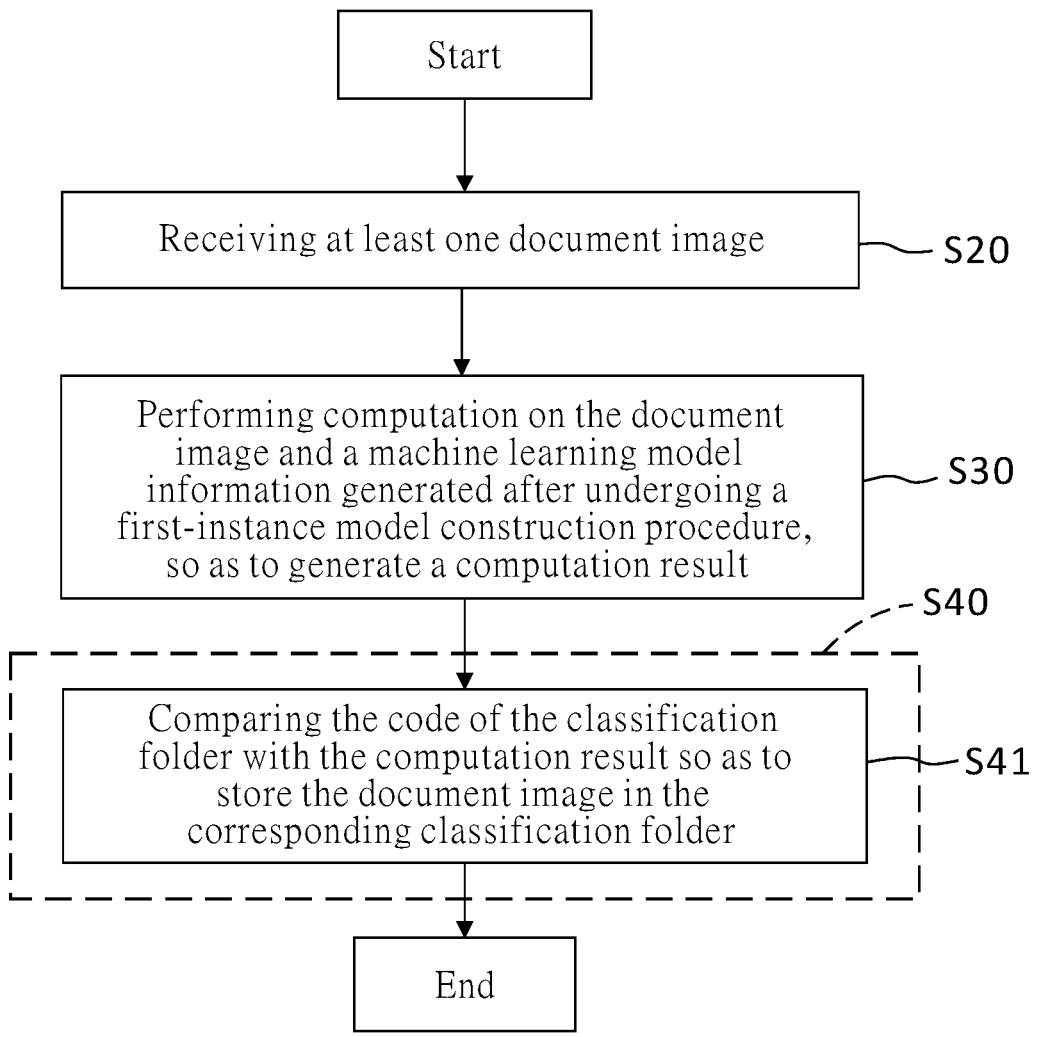
FIG. 4 is the second flowchart of the method according to the preferred embodiment of the present disclosure.

Referring to FIG. 4, the method further comprises, after the step of storing the document image in the corresponding classification folder 131 according to the computation result and the code 132 of the classification folder 131 (S40), the step of comparing the code 132 of the classification folder 131 with the computation result so as to store the document image in the corresponding classification folder 131 (S41).

Figure 5:
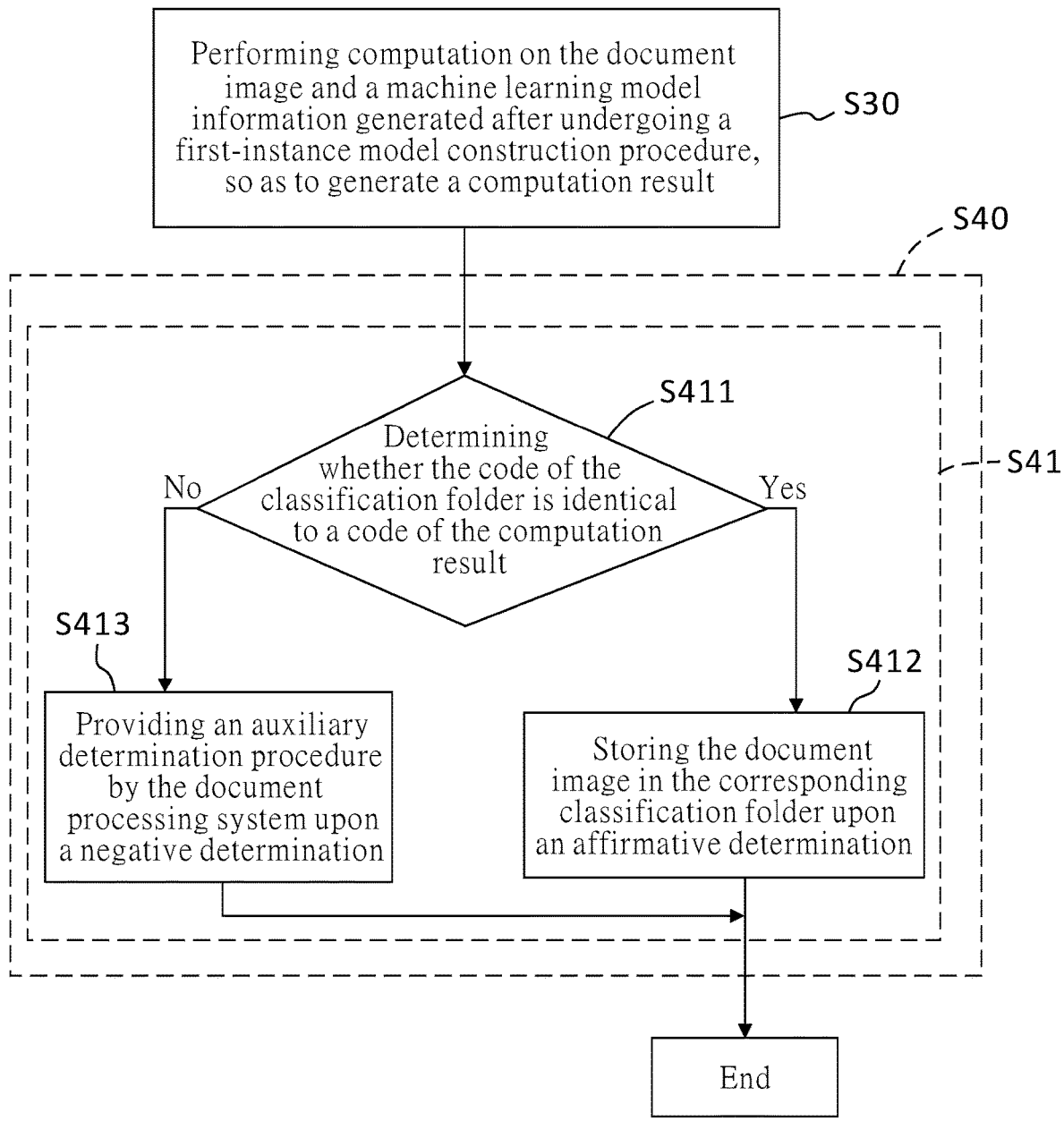
FIG. 5 is the third flowchart of the method according to the preferred embodiment of the present disclosure.
Figure 6:
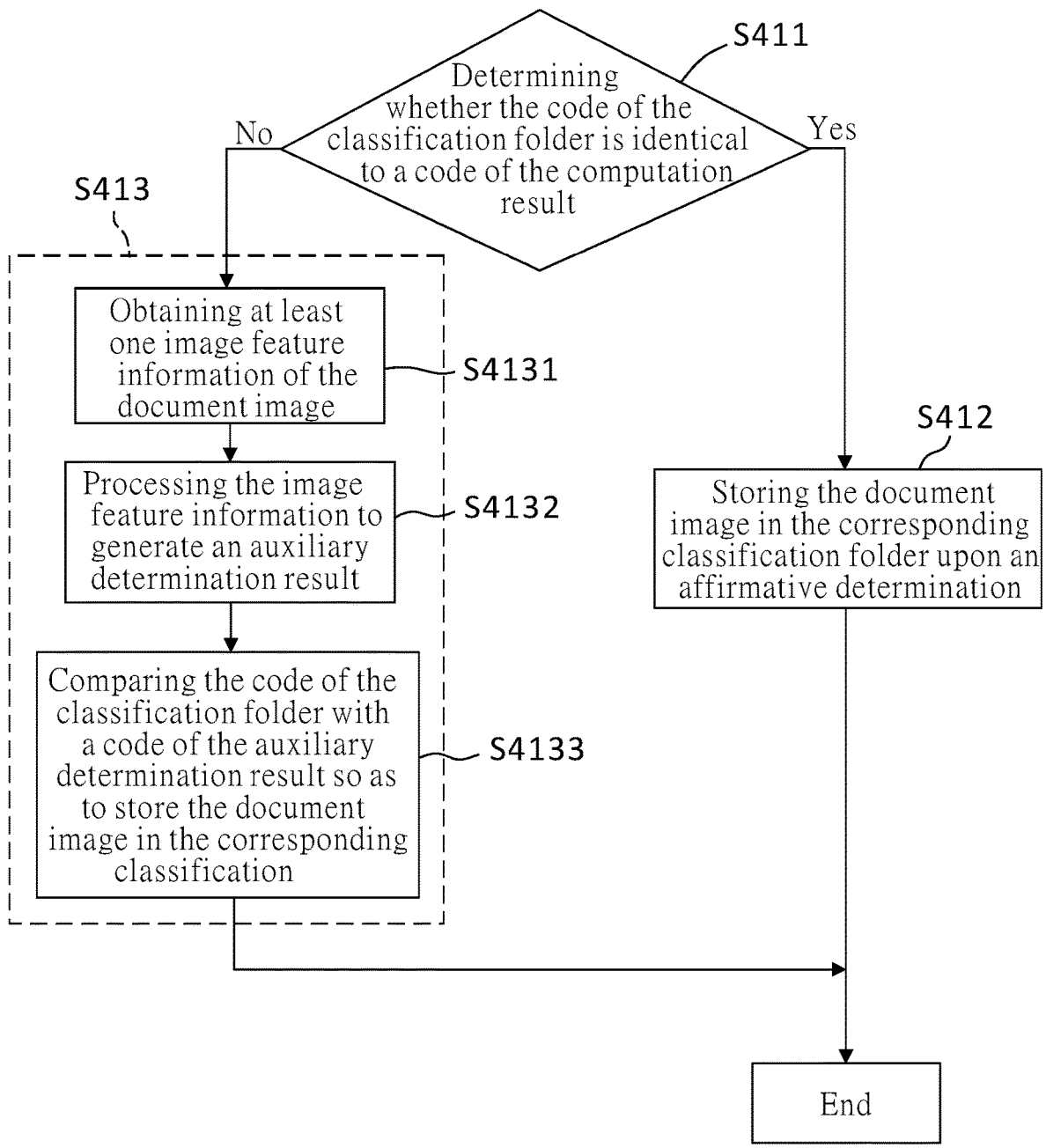
FIG. 6 is the fourth flowchart of the method according to the preferred embodiment of the present disclosure.

Referring to FIG. 5, the method further comprises, after the step of comparing the code 132 of the classification folder 131 with the computation result so as to store the document image in the corresponding classification folder 131 (S41), the steps of:

determining whether the code 132 of the classification folder 131 is identical to a code of the computation result (S411); and storing the document image in the corresponding classification folder 131 upon an affirmative determination (S412).

Referring to FIG. 5, the method further comprises, after the step of determining whether the code 132 of the classification folder 131 is identical to a code of the computation result (S411), the step of providing an auxiliary determination procedure by the document processing system upon a negative determination (S413).

Referring to FIG. 5, 6, the auxiliary determination procedure comprises the steps of:

obtaining at least one image feature information of the document image (S4131);

processing the image feature information to generate an auxiliary determination result (S4132); and comparing the code 132 of the classification folder 131 with a code of the auxiliary determination result so as to store the document image in the corresponding classification 131 (S4133), wherein the image feature information comprises an optical character recognition (OCR) information, a document image size information, and a document image color information.

Figure 7:
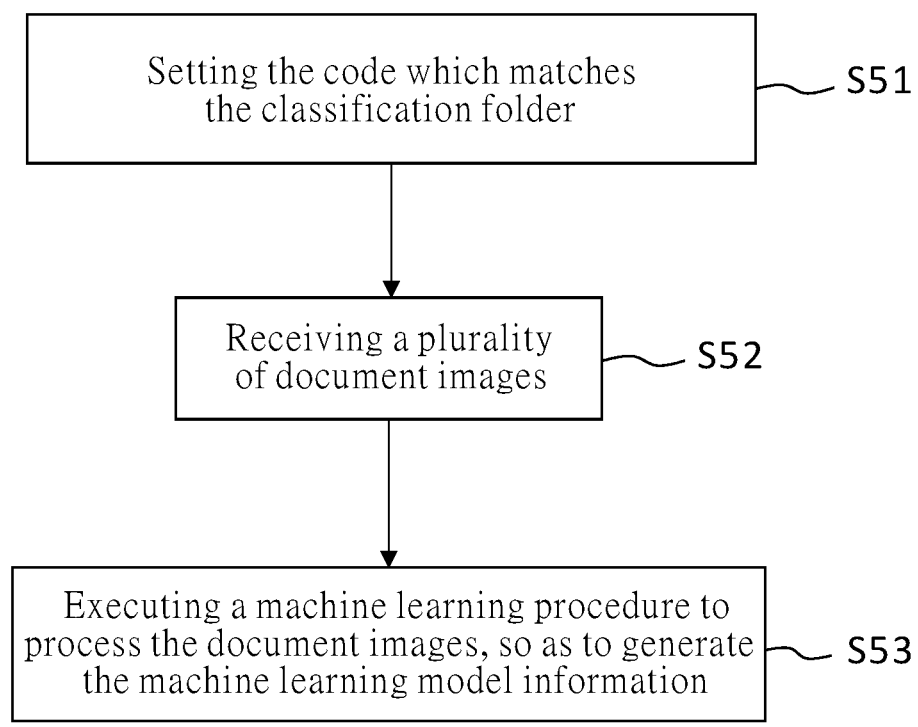
FIG. 7 is the fifth flowchart of the method according to the preferred embodiment of the present disclosure.

In this embodiment, Referring to FIG. 7, the first-instance model construction procedure further comprises the steps of:

setting the code 132 which matches the classification folder 131 (S51);

receiving a plurality of document images (S52), wherein the received document image is for use in machine learning; and executing a machine learning procedure to process the document images, so as to generate the machine learning model information (S53), wherein the machine learning model information comprises coefficients, one of which matches the code 132 of the classification folder 131.

Figure 8:
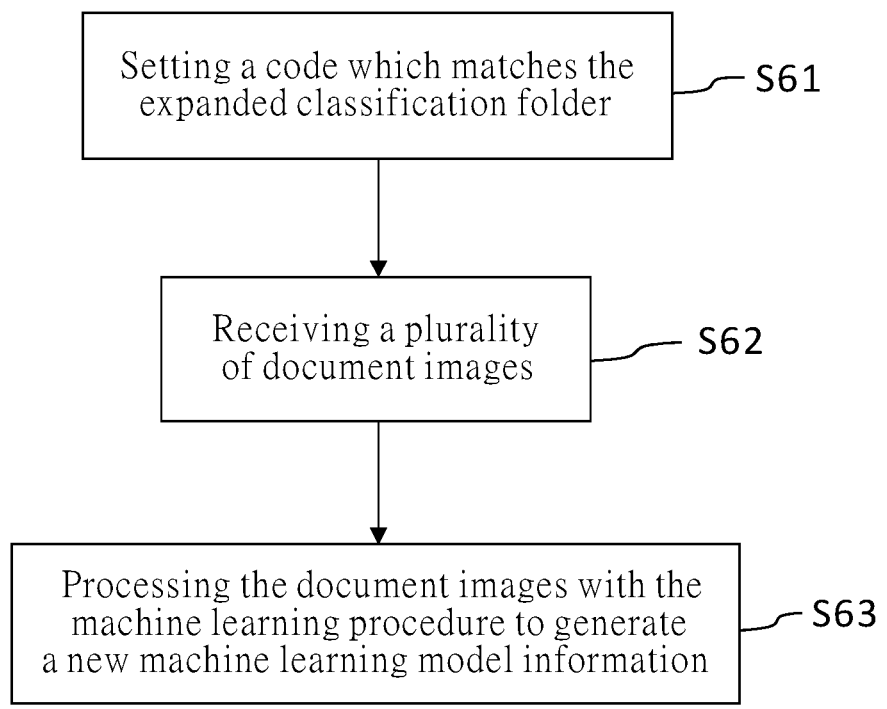
FIG. 8 is the sixth flowchart of the method according to the preferred embodiment of the present disclosure.

In this embodiment, to classify new document images, the document processing system further comprises at least one expanded classification folder 141, and the method further provides an expansion model construction procedure. Referring to FIG. 8, the expansion model construction procedure further comprises the steps of:

setting a code 142 which matches the expanded classification folder 141 (S61);

receiving a plurality of document images (S62), wherein the received document image is for use in machine learning;

processing the document images with the machine learning procedure to generate a new machine learning model information (S63), wherein the new machine learning model information comprises new coefficients, and the new coefficients match the code 132 of the classification folder 131 and the code 142 of the expanded classification folder 141.

While the present disclosure has been described by means of specific embodiments, numerous modifications and variations could be made thereto by those skilled in the art without departing from the scope and spirit of the present disclosure set forth in the claims.

What is claimed is:

1. A document processing method for performing document classification by machine learning, the method being applicable to a document processing system preconfigured with at least one classification folder, the classification folder matching a code, the method comprising the steps of:
   receiving at least one document image;
   performing computation on the document image and a machine learning model information generated after undergoing a first-instance model construction procedure, so as to generate a computation result; and
   storing the document image in a corresponding classification folder according to the computation result and the code of the classification folder,
   wherein, after the step of storing the document image in a corresponding classification folder according to the computation result and the code of the classification folder, the step of comparing the code of the classification folder with the computation result so as to store the document image in the corresponding classification folder,
   wherein, after the step of comparing the code of the classification folder with the computation result so as to store the document image in the corresponding classification folder, the steps of: determining whether the code of the classification folder is identical to a code of the computation result; and storing the document image in the corresponding classification folder upon an affirmative determination,
   wherein, upon a negative determination of the step of determining whether the code of classification folder is identical to a code of the computation result, the step of providing an auxiliary determination procedure,
   wherein, the auxiliary determination procedure comprises the steps of: obtaining at least one image feature information of the document image; processing the image feature information to generate an auxiliary determination result; and comparing the code of the classification folder with a code of the auxiliary determination result so as to store the document image in the corresponding classification folder.

2. The method of claim 1, wherein the first-instance model construction procedure further comprises the steps of:
   setting a code matching the classification folder;
   receiving a plurality of document images; and
   executing a machine learning procedure to process the document images and thereby generate the machine learning model information.

3. The method of claim 2, wherein the machine learning model information comprises coefficients, one of which matches the code of the classification folder.

4. The method of claim 1, further comprising the step of providing an expansion model construction procedure, wherein the document processing system further comprises at least one expanded classification folder.

5. The method of claim 4, wherein the expansion model construction procedure further comprises the steps of:
   setting a code matching the expanded classification folder;
   receiving a plurality of document images; and
   processing the document images with the machine learning procedure to generate a new machine learning model information.

6. The method of claim 5, wherein the new machine learning model information comprises new coefficients, and the new coefficients match the code of the classification folder and the code of the expanded classification folder.

7. The method of claim 1, wherein the document processing system comprises a photocopier, a scanner or a multifunction printer.

8. A document processing system for performing document classification by machine learning, comprising:
   an input module for obtaining at least one document image;
   at least one storage module preconfigured with a classification folder matching a code; and
   a processing module connected to the input module and the at least one storage module,
   wherein the processing module receives the document image, performs computation on the document image and a machine learning model information generated after undergoing a first-instance model construction procedure so as to generate a computation result, and compares the code of the classification folder with the computation result so as to store the document image in the corresponding classification folder,
   wherein the processing module compares the code of the classification folder with a code of the computation result and stores, upon determination that the code of the classification folder is identical to the code of the computation result, the document image in the corresponding classification folder,
   wherein, after determining that the code of the classification folder is not identical to the code of the computation result, the processing module further executes an auxiliary determination procedure, obtains at least one image feature information according to the document image, processes the image feature information to generate an auxiliary determination result, and compares the code of the classification folder with a code of the auxiliary determination result so as to store the document image in the corresponding classification folder.

9. The system of claim 8, wherein the image feature information comprises an optical character recognition information, a document image size information or a document image color information.

10. The system of claim 8, wherein, upon execution of the first-instance model construction procedure by the processing module, the input module receives a plurality of document images, and the processing module processes the document images by a machine learning procedure to generate the machine learning model information comprising coefficients, one of which matches the code of the classification folder.

11. The system of claim 8, further comprising at least one expansion storage module preconfigured with an expanded classification folder, wherein the processing module executes an expansion model construction procedure to set a code matching the expanded classification folder and receives a plurality of document images, and the document images are processed with the machine learning procedure to generate a new machine learning model information comprising new coefficients, wherein the new coefficients match the code of the classification folder and the code of the expanded classification folder.

* * * * *